United States Patent
Nakamichi

(10) Patent No.: US 6,712,046 B2
(45) Date of Patent: Mar. 30, 2004

(54) ENGINE CONTROL DEVICE

(75) Inventor: Masaki Nakamichi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 38 days.

(21) Appl. No.: 10/038,580

(22) Filed: Jan. 8, 2002

(65) Prior Publication Data
US 2003/0079725 A1 May 1, 2003

(30) Foreign Application Priority Data
Oct. 25, 2001 (JP) ..................... 2001-327646

(51) Int. Cl.$^7$ .............................................. F02D 41/22
(52) U.S. Cl. ...................................... 123/479; 123/488
(58) Field of Search ................................. 123/479, 488, 123/494, 690; 701/107, 114

(56) References Cited

U.S. PATENT DOCUMENTS 4,949,694 A * 8/1990 Nagaishi et al. ............ 123/494
5,163,407 A * 11/1992 Yoshida et al. ........... 123/494 X

FOREIGN PATENT DOCUMENTS

JP 2000-320382 11/2000

* cited by examiner

Primary Examiner—Tony M. Argenbright
(74) Attorney, Agent, or Firm—Sughrue Mion, PLLC

(57) ABSTRACT

An engine control device includes a reference voltage memory device (21) for memorizing reference voltage VAFS_STD of AFS (9) for controlling an engine (1) under a normal state, a comparing device (22) for comparing an output voltage VAFS from the AFS (9) when the engine (1) is stopped with the reference voltage VAFS_STD, and calculating a deviation ΔVAFS, and a corrections device (23) for correcting the output voltage VAFS from the AFS (9) (based on the deviation ΔVAFS so that the output voltage VAFS becomes the reference voltage VAFS_STD; A fuel injection quantity Tinj is calculated based on the output voltage VAFS_OBJ from the sensor obtained by the correction device (23), so that engine stall caused by failure of the sensor for controlling the engine is avoided.

18 Claims, 3 Drawing Sheets

ENGINE CONTROL DEVICE

BACKGROUND OF THE INVENTION

Field of the Invention

The present invention relates to an engine control device for automobiles, in particular, to avoidance of engine stall caused by failure of sensors for controlling an engine.

DISCUSSION OF BACKGROUND

In the conventional technique, failure of sensors for controlling an engine is diagnosed, and an output from thus diagnosed sensor is not used. Instead, a fail safe mode utilizing an alternate method is selected.

For example, in an air flow sensor detecting an intake air flow rate to an engine, when a wire is broken or shorted, it is possible to detect before the engine is started. However, in a case where an output error caused by, for example, deterioration of a sensor, is detected, in order to avoid erroneous diagnosis of a normal sensor, the sensors are diagnosed while the engine is running. When failure of a sensor is diagnosed under the state that the engine is running, a control means working based on a throttle opening degree and an engine revolution number is instead used to assure limp home capability, wherein the limp home means that a vehicle can be moved by actuating minimum functions necessary to control the engine so that a driver can drive the vehicle to a repair yard without risks of engine stall and runaway even though sensors of the vehicle are out of order.

However, there is a case where conditions of failure diagnosis are not established with respect to a certain failure mode of a sensor. In this case, there is a problem that the engine is stalled after starting the engine because the fail safe mode is not selected.

For example, when a failure occurs under a state that an output from an air flow sensor drifts in a direction of increasing an air flow rate, there are problems that neither a break nor a short are detectable in a failure diagnosis, and rotation of the engine becomes unstable after starting the engine, thus, causing the engine to stall because a controlling computer recognizes the air flow rate as more than actually sucking, and therefore more fuel than necessary is supplied to cause an over rich condition.

SUMMARY OF THE INVENTION

It is an object of the present invention to solve the above-mentioned problems inherent in the conventional technique and to provide an engine control device, which can avoid a situation in which an engine is stalled by failure of sensors for controlling the engine.

According to a first aspect of the present invention, there is provided an engine control device comprising: a reference voltage value memory means for memorizing a reference voltage value of a sensor for controlling an engine under a normal state; a comparing means for comparing an output voltage value from the sensor under a state that the engine is stopped with the reference voltage value, and calculating a deviation; and a correction means for correcting the output voltage value from the sensor based on the deviation so as to be the reference voltage value, wherein a fuel injection quantity is calculated based on the output voltage value from the sensor obtained by the correction means.

According to a second aspect of the present invention, there is provided the engine control device further comprising: a sensor failure diagnosing means for diagnosing the failure of the sensor based on the output voltage value from the sensor obtained by the correction means after the engine is started.

According to a third aspect of the present invention, there is provided the engine control device, wherein fuel injection is controlled by an alternate means when the failure of the sensor is determined by the sensor failure diagnosing means.

According to a fourth aspect of the present invention, there is provided the engine control device, wherein the sensor is a sensor for detecting an engine load used to calculate the fuel injection quantity.

According to a fifth aspect of the present invention, there is provided the engine control device, wherein the sensor for detecting the engine load is an air flow sensor detecting an intake air flow quantity to the engine.

According to a sixth aspect of the present invention, there is provided the engine control device, wherein the sensor for detecting the engine load is a pressure sensor detecting an intake air pressure to the engine.

According to a seventh aspect of the present invention, there is provided the engine control device, wherein the sensor for detecting the engine load is a throttle sensor detecting a throttle opening degree.

According to an eighth aspect of the present invention, there is provided the engine control device, wherein the sensor for detecting the engine load is an accelerator sensor for detecting an opening degree of the accelerator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of a preferred embodiment of the present invention in reference to FIGS. 1 through 3 as follows, wherein the same numerical references are used for the same or similar portions and description of these portions is omitted.

Embodiment 1

Figure 1:
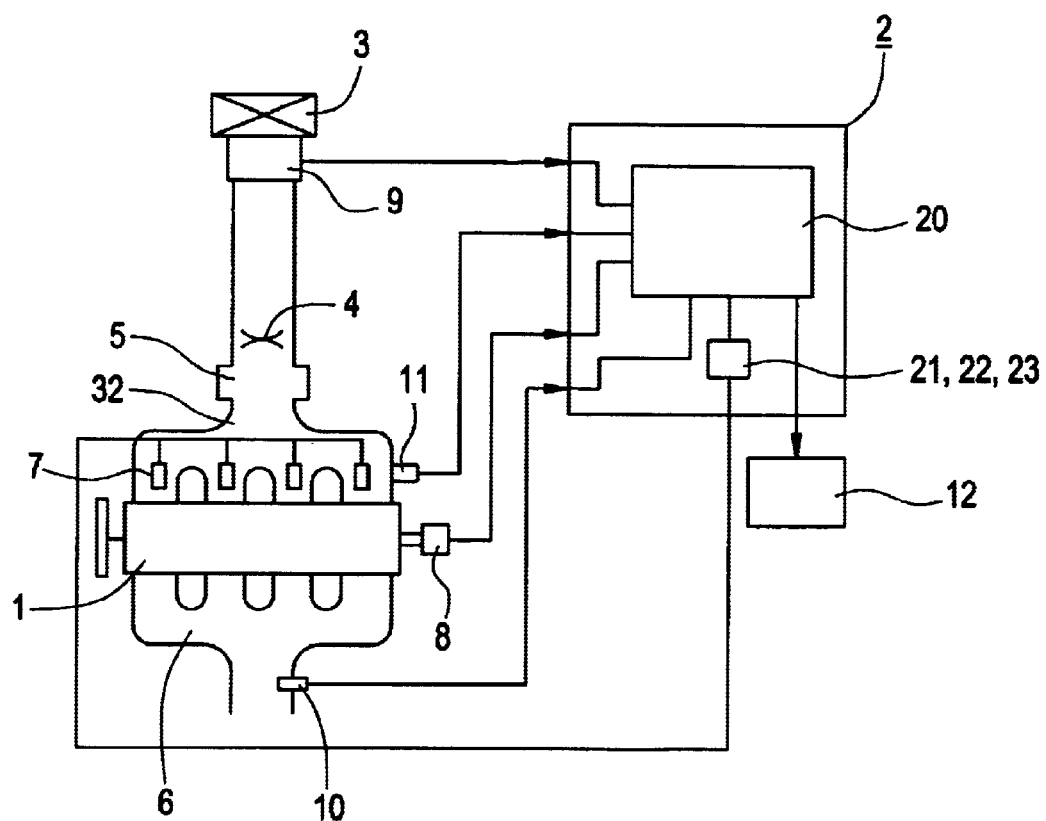
FIG. 1 illustrates an entire structure of an engine control device according to Embodiment 1 of the present invention.
Figure 2:
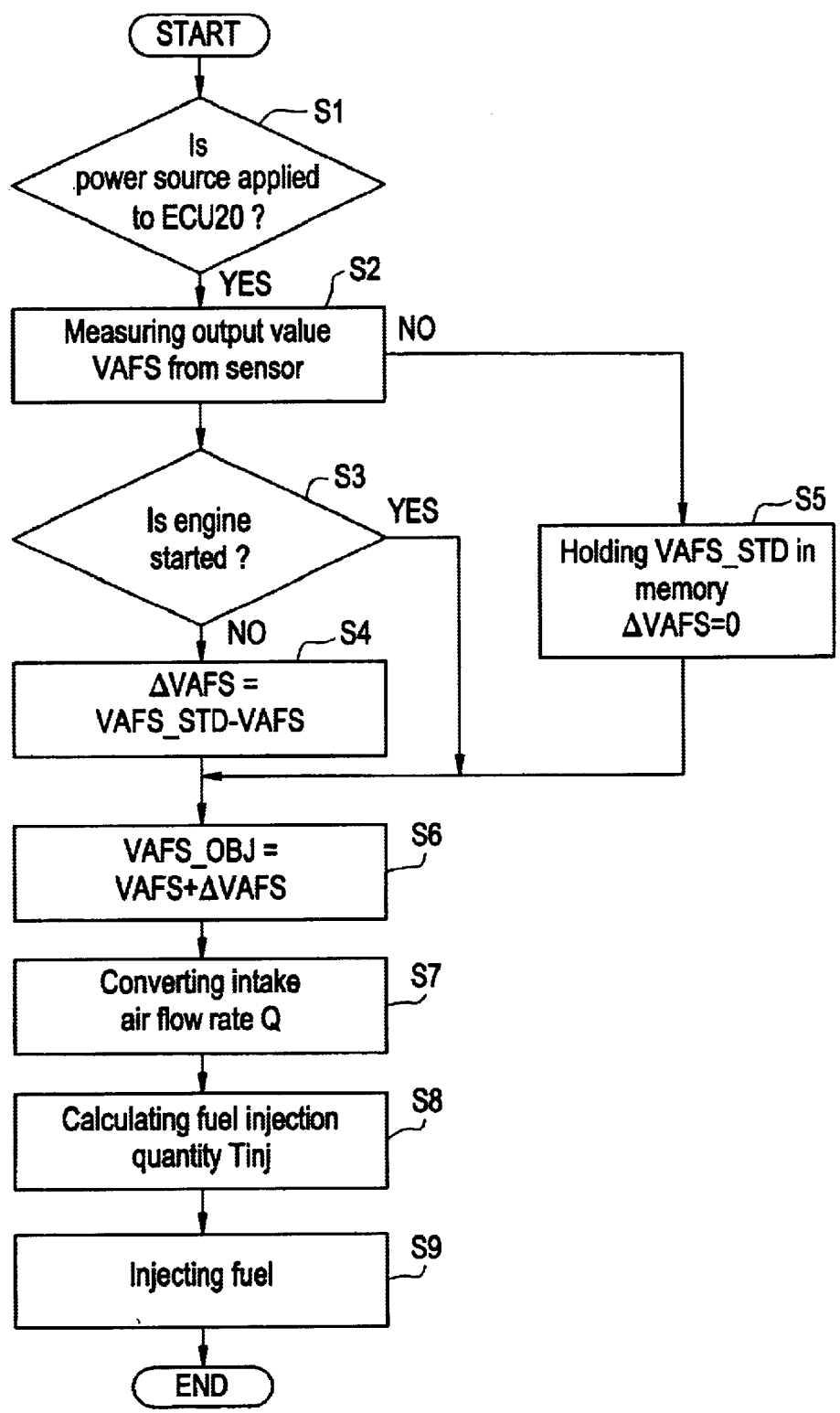
FIG. 2 is a flowchart showing operation of the engine control device according to Embodiment 1 of the present invention.

FIG. 1 illustrates an entire structure of an engine control device according to Embodiment 1 of the present invention. FIG. 1 illustrates an engine 1; an intake pipe 32; an air filter 3 attached to the intake pipe 32; a throttle valve 4 for adjusting an air flow rate; a surge tank 5; and an exhaust pipe 6.

A fuel injection valve 7 is prepared for every cylinder in the engine 1. The fuel injection valves are opened by an injection pulse signal outputted from an electronic controlled fuel injection unit 2 (hereinbelow referred to as ECU), in which a microcomputer 20 is built, at a predetermined timing in synchronism with rotation of the engine 1 to inject fuel, adjusted to have a predetermined pressure, to the engine 1.

A crank angle sensor 8, outputting a pulse signal in synchronism with rotation of a crank shaft of the engine 1 and detecting the rotational number N of the engine 1 for calculation of an injection quantity, an air flow sensor 9 (hereinbelow referred to as AFS), arranged on a downstream side of the air filter and outputting a voltage value in correspondence with the intake air flow rate Q inside the intake pipe 32, an $O_2$ sensor 10, detecting an oxygen concentration in exhaust gas, a water temperature sensor 11, and so on, are connected to the ECU 2.

The ECU 2 inputs output signals from the crank angle sensor 8, the AFS9, the O2 sensor 10, and the water temperature sensor 11 to control the fuel injection valve 7, located respectively in the cylinders of the engine 1 and informs of a result of failure detection from the AFS 9 by lighting a warning lamp 12.

The microcomputer 20 inside the ECU 2 includes a reference voltage value memory means 21, storing a normal reference voltage value of the AFS 9, a comparing means 22, measuring an output voltage value from the AFS 9 when a power source is inputted to the ECU 2 and comparing the output voltage with the voltage value, memorized in the reference voltage value memory means 21, and a correction means 23 for correcting a sensor output voltage value to a normal voltage using a sensor voltage deviation, calculated by the comparing means 22.

The intake air flow rate Q is converted based on the output voltage value from the AFS 9 by the ECU 2. The ECU 2 calculates a basic fuel injection quantity Tb from the intake air flow rate Q and the engine rotational number N, provides the results of the calculation with various corrections to obtain a final fuel injection quantity Tinj, and determines a pulse width of the injection pulse signal to the fuel injection valve 7.

Next, an operation will be described. FIG. 2 is a flowchart showing an operation of the engine control device according to Embodiment 1 of the present invention. In FIG. 2, in step S1, it is judged whether or not the power source is inputted to the ECU 2. When the power source is turned off, step S5 is selected to hold the reference voltage value VAFS_STD, being an output reference value of a normal AFS 9 detecting the intake air flow rate Q in a memory inside the reference voltage value memory means 21 in the microcomputer 20. When the power source is turned on, step S2 is selected.

In step S2, an output voltage value VAFS from the AFS 9 is measured. In step S3, it is judged whether or not the engine is started. When the engine is not started yet, in step S4, the reference voltage value VAFS_STD of the normal AFS9, previously stored in the memory inside the reference voltage value means 21, is compared to the actually measured output voltage value VAFS from the AFS 9. A deviation ΔVAFS, calculated by subtracting the output voltage value VAFS from the reference voltage value FAFS_STD, is stored in a memory.

In step S6, an output voltage value VAFS_OBJ from the AFS 9, used to convert to the intake air flow rate Q, is calculated by adding VAFS to ΔVAFS. In step S7, the intake air flow rate Q is calculated. When it is judged that the engine is started in step S3, the stored deviation ΔVAFS is not renewed.

In step S8, the fuel injection quantity Tinj is calculated. First, a basic fuel injection quantity Tb=K×Q/N is calculated, where Q designates the intake air flow rate, N designates the rotational number of the engine 1, and K designates a constant. The final fuel injection quantity Tinj is calculated by providing various corrections, such as Tinj=Tb×Kelse, where Kelse designates coefficients for the various corrections. Based on the final fuel injection quantity Tinj, the pulse width of the injection pulse signal to the fuel injection valve 7 is determined. In step S9, fuel is injected.

As described above, according to Embodiment 1, the output voltage value VAFS from the AFS 9 is corrected so as to be the reference voltage value VAFS_ST of the normal AFS 9, and the fuel injection quantity Tinj is calculated based on the corrected output voltage value VAFS_OBJ from the AFS 9. Therefore, the corrected output voltage value VAFS_OBJ from the AFS 9 becomes an output voltage value similar to that from the normal AFS 9, whereby stall of the engine caused by failure of the AFS 9 is avoidable.

Further, in Embodiment 1, although the AFS 9 is exemplified as a sensor for detecting the intake air flow rate Q, effects similar to those described in Embodiment 1 is obtainable by using various sensors for detecting engine load such as a pressure sensor for detecting a pressure, i.e. intake negative pressure in the intake pipe 32, a throttle sensor for detecting an opening degree of the throttle valve, and an accelerator sensor for detecting an opening degree of an accelerator.

Embodiment 2

Figure 3:
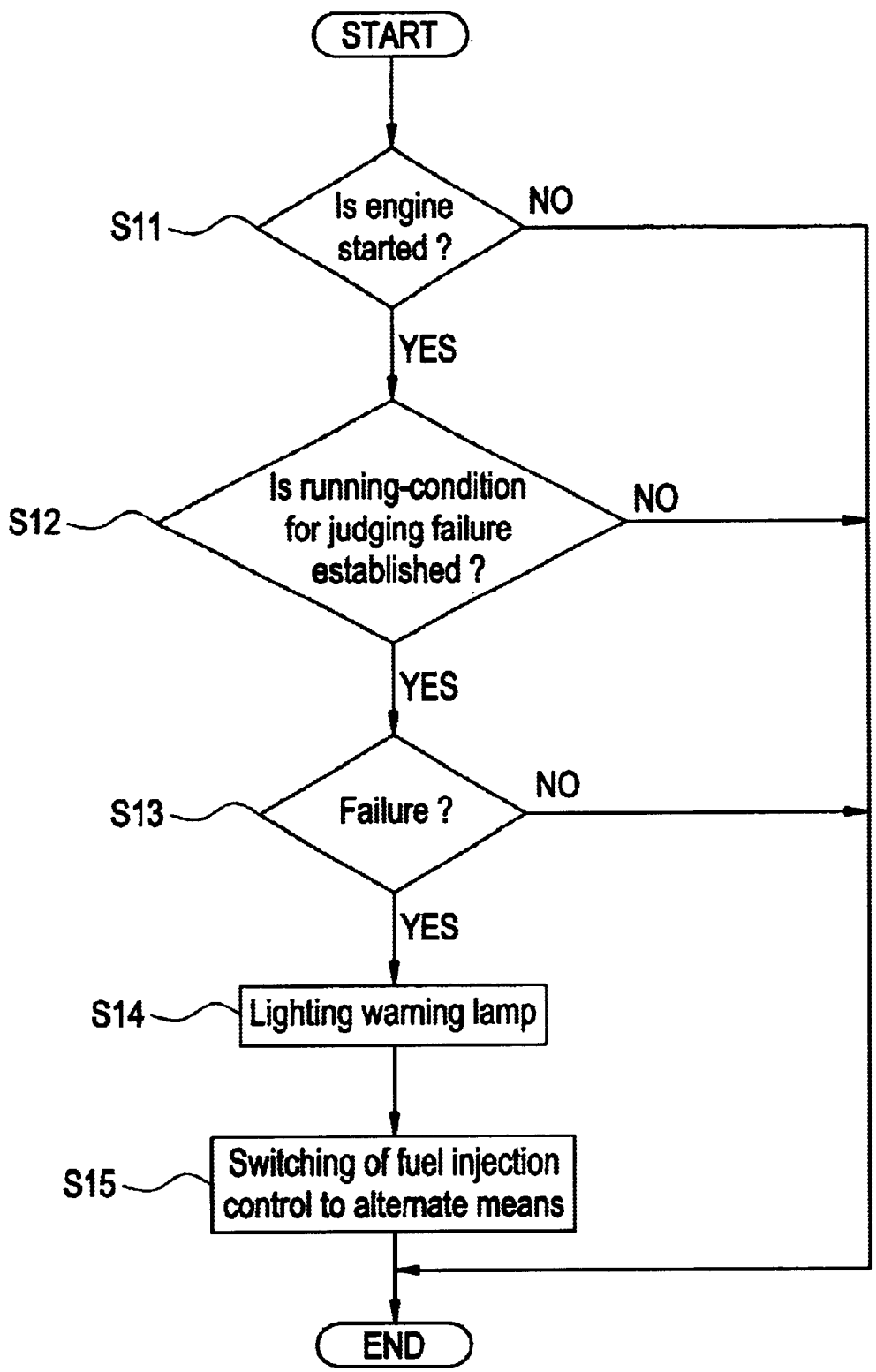
FIG. 3 is a flowchart showing operation of the engine control device according to Embodiment 2 of the present invention.

FIG. 3 is a flowchart showing an operation of an engine control device according to Embodiment 2 of the present invention. In FIG. 3, in step S11, it is confirmed that the engine 1 is started and under a stable running condition after the operation flow described in Embodiment 1. When the engine 1 is started and stabilized, in step S12, it is judged whether or not stable running conditions of the engine 1 where failure can be certainly detectable, for example a running condition that the engine is currently running at a high rotational number and the accelerator opening degree is large, are satisfied. When the running conditions are satisfied, it is judged whether or not the sensor is in failure or normal in step S13. For example, in the above-mentioned running conditions in step S12, if an output voltage value of a sensor, e.g. VAFS in Embodiment 1, is a predetermined voltage value or less, the sensor is in failure.

When it is judged to be in failure, the warning lamp 12 is lit in step S14 to alert a driver. In step S15, the fuel injection quantity is calculated by an alternate means without using the fuel injection quantity, caculated in accordance with the flowchart illustrated in FIG. 2 based on the output from the sensor. If the sensor is the AFS 9, the alternate means used after the failure is judged is, for example, a means for operating the fuel injection quantity in use of the engine rotational number and the throttle sensor.

As described, in accordance with Embodiment 2, when the failure of the sensor is diagnosed and the failure is determined, since the fuel injection quantity is calculated by the alternate means, failure of a sensor having abnormal characteristics that would cause an engine stall is detectable, and a limp home capability can be improved.

The first advantage of the present invention is that an effect of avoiding engine stall caused by failure of a sensor is obtainable since a corrected output voltage value from the sensor is substantially the same as an output voltage value from a normal sensor.

The second advantage of the present invention is that failure of a sensor, having abnormal characteristics, which would cause an engine stall, is detectable.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 2001-327646 filed on Oct. 25, 2001 including specification, claims, drawings and summary are incorporated herein by reference in its entirety.

What is claimed is:

1. An engine control device comprising:
   a reference voltage value memory means for memorizing a reference voltage value of a sensor for controlling an engine under a normal state;
   a comparing means for comparing an output voltage value from the sensor under a state that the engine is stopped with the reference voltage value, and calculating a deviation; and
   a correction means for correcting the output voltage value from the sensor based on the deviation so as to be the reference voltage value, wherein a fuel injection quantity is calculated based on the output voltage value of the sensor obtained by the correction means.

2. The engine control device according to claim 1, further comprising:
   a sensor failure diagnosing means for diagnosing the failure of the sensor based on the output voltage value from the sensor obtained by the correction means after the engine is started.

3. The engine control device according to claim 2, wherein fuel injection is controlled by an alternate means when the failure of the sensor is determined by the sensor failure diagnosing means.

4. The engine control device according to claim 1, wherein the sensor is a sensor for detecting an engine load used to calculate the fuel injection quantity.

5. The engine control device according to claim 2, wherein the sensor is a sensor for detecting an engine load used to calculate the fuel injection quantity.

6. The engine control device according to claim 3, wherein the sensor is a sensor for detecting an engine load used to calculate the fuel injection quantity.

7. The engine control device according to claim 4, wherein the sensor for detecting the engine load is an air flow sensor detecting an intake air flow quantity to the engine.

8. The engine control device according to claim 5, wherein the sensor for detecting the engine load is an air flow sensor detecting an intake air flow quantity to the engine.

9. The engine control device according to claim 6, wherein the sensor for detecting the engine load is an air flow sensor detecting an intake air flow quantity to the engine.

10. The engine control device according to claim 4, wherein the sensor for detecting the engine load is a pressure sensor detecting an intake air pressure to the engine.

11. The engine control device according to claim 5, wherein the sensor for detecting the engine load is a pressure sensor detecting an intake air pressure to the engine.

12. The engine control device according to claim 6, wherein the sensor for detecting the engine load is a pressure sensor detecting an intake air pressure to the engine.

13. The engine device according to claim 4, wherein the sensor for detecting the engine load is a throttle sensor detecting a throttle opening degree.

14. The engine control device according to claim 5, wherein the sensor for detecting the engine load is a throttle sensor detecting a throttle opening degree.

15. The engine control device according to claim 6, wherein the sensor for detecting the engine load is a throttle sensor detecting a throttle opening degree.

16. The engine control device according to claim 4, wherein the sensor for detecting the engine load is an accelerator sensor for detecting an opening degree of the accelerator.

17. The engine control device according to claim 5, wherein the sensor for detecting the engine load is an accelerator sensor for detecting an opening degree of the accelerator.

18. The engine control device according to claim 6, wherein the sensor for detecting the engine load is an accelerator sensor for detecting an opening degree of the accelerator.

* * * * *